United States Patent [19]

Moriwake

[11] Patent Number: 5,042,605
[45] Date of Patent: Aug. 27, 1991

[54] APPARATUS FOR CONTROLLING AIR CUSHION VEHICLE

[75] Inventor: Takumi Moriwake, Okayama, Japan

[73] Assignee: Sorekkusu Kabushiki Kaisha, Okayama, Japan

[21] Appl. No.: 448,111

[22] Filed: Dec. 12, 1989

[30] Foreign Application Priority Data

Jan. 7, 1989 [JP] Japan .................................... 1-1452

[51] Int. Cl.⁵ ................................................. B60V 1/14
[52] U.S. Cl. ...................................... 180/117; 244/52;
244/110 B; 239/265.25; 239/265.29;
239/265.31
[58] Field of Search .................. 244/12.1, 52, 51, 235,
244/89; 180/116, 117; 239/265.25, 265.27,
265.29

[56] References Cited

U.S. PATENT DOCUMENTS

| 2,637,164 | 5/1953 | Robson et al. | 244/110 B |
| 2,944,394 | 7/1960 | Peregrine | 244/110 B |
| 3,166,273 | 1/1965 | Balluff | 244/52 |
| 3,587,771 | 6/1971 | Fauve | 180/117 |
| 3,608,662 | 9/1971 | Ferguson | 180/117 |
| 3,610,556 | 10/1971 | Charlton, Jr. | 244/52 |
| 3,655,133 | 4/1972 | Medawar | 244/110 B |

Primary Examiner—Galen Barefoot
Attorney, Agent, or Firm—Browdy and Neimark

[57] ABSTRACT

The present invention relates to an apparatus for controlling an air cushion vehicle (trade name, Hovercraft) of a vehicle to be driven by air flowing pressure, in which rudders are provided along both side walls of a propulsion fan duct, the rear sides of the rudders are bent toward the outside of the propulsion fan duct to perform the abrupt braking at the time of linearly moving and reverse moving of the air cushion vehicle, and the handle column for turning the direction is tiltably provided to easily move reversely the air cushion vehicle by the same handle steering operation.

2 Claims, 5 Drawing Sheets

APPARATUS FOR CONTROLLING AIR CUSHION VEHICLE

BACKGROUND OF THE INVENTION

1. Field of the Invention

The present invention relates to an apparatus for controlling an air cushion vehicle (trade name, Hovercraft) of a vehicle to be driven by air flowing pressure.

2. Prior Art

As a conventional apparatus for controlling air cushion vehicle, there are a steering system in which one rudder is vertically disposed in the rear opening of a propulsion fan duct and a steering system in which a plurality of rudders are vertically disposed in parallel. In both systems, the air cushion vehicle is steered by altering the flow of air from the propulsion fan duct by regulating the direction of the rudder.

In the conventional an apparatus for controlling, when the air cushion vehicle is steered by one rudder, its steering performance is limited. When a plurality of rudders are provided, it is necessary to rotatably dispose the rudders, and its structure is accordingly complicated. Further, since it is difficult to separately operate the rudders, the rudders are so constructed as to be cooperated with one each other. Thus, even if the plurality of rudders are provided, its steering performance cannot be sufficiently achieved.

Further, in both cases, the rudders are used only to control the linear travel or turning to the left or to the right of the air cushion vehicle, but the air cushion vehicle cannot be moved reversely.

Since the rudders are always disposed in the air stream in the propulsion fan duct, when the air cushion vehicle is moved linearly, the rudders act as resistance against the air stream, thereby disturbing the propulsion efficiency of the air cushion vehicle.

Moreover, in order to move reversely the air cushion vehicle, another device therefor is required. In order to steer the reverse driving device, it is necessary to provide a steering handle, steering rod or steering pedal separately from the handle for steering the rudders, the steering of the air cushion vehicle becomes complicated, and skillful technique is required.

SUMMARY OF THE INVENTION

Accordingly, an object of the present invention is to provide an apparatus for controlling air cushion vehicle which eliminates the disadvantages of the conventional apparatus for controlling air cushion vehicle.

According to the present invention, rudders are provided along both the side walls of a propulsion fan duct having the fan. Accordingly, the rudders do not normally disturb the air stream from the propulsion fan duct, thereby efficiently moving linearly the air cushion vehicle.

According to the present invention, the rear sides of the rudder provided along both the side walls of the propulsion fan duct are bent toward the outside of the propulsion fan duct. Accordingly, when the rudders are operated, the air stream from the propulsion fan duct is positively altered by the bent portions, thereby easily converting the direction of the air cushion vehicle.

According further to the present invention, the rear sides of the rudders along both the side walls of the propulsion fan duct are bent toward the outsides of the propulsion fan duct. Accordingly, when both the left and right rudders are operated to approach the front ends of the rudders in the propulsion fan duct, the air stream from the propulsion fan duct can be so converted as to flow forwardly from both the left and right sides of the air cushion vehicle through the bent portions of the left and right rudders, thereby easily abruptly braking the air cushion vehicle at the time of linearly moving and performing the reverse traveling of the air cushion vehicle.

According to the present invention, operation arms are respectively provided at the rudder rotary shafts of the rudders bent outwardly at the the rear sides provided at the left and right sides and the handle column provided in the driver's can is rotatably provided, the handle column provided in the driver's cab is rotatably provided, the control arm extending leftwardly and rightwardly is provided at the handle column, the operation arm of the left and right rudders are connected to the control arm extending leftwardly and rightwardly through the connecting cables. Accordingly, when the handle is operated to rotate the handle column to the left or to the right, the left and right rudder rotary shafts are rotated to the right or to the left through the control arm provided at the handle column, the connecting cables and the operation arms provided at the rudder rotary shafts provided to alter the directions of the left and right rudders, thereby altering the flow of the air stream from the propulsion fan duct to the left or to the right. Therefore, the direction of the air cushion vehicle can be easily altered by the handle operation.

According to the present invention as described above, the handle column is tiltable in the longitudinal direction in the air cushion vehicle in which the operation arms are provided at the rudder rotary shafts of the rudder bent outwardly at the rear sides provided at the left and right sides, the handle column provided in the driver's cab is rotatably provided, the control arm extending leftwardly and rightwardly is provided at the handle column, and the operation arms of the left and right rudders are connected to the control arm extending leftwardly and rightwardly through the connecting cables. Accordingly, when the handle is operated to tilt the handle column, for example, in the rearward direction, the operation arms provided at the rudder rotary shafts is moved rearwardly through the operation arms provided at the handle column and the left and right connecting cables, the left and right rudder rotary shafts are turned to the left or to the right thereby to approach the front ends of the left and right rudders in the propulsion fan duct, thereby converting the air stream from the propulsion fan duct from the left and right sides of the air cushion vehicle toward the forward direction by the bent portions of the rudders. Accordingly, the air cushion vehicle can be abruptly braked or moved reversely at the time of moving linearly of the air cushion vehicle easily by utilizing the handle used for converting the direction.

More specifically, according to the present invention, there is provided an apparatus for controlling air cushion vehicle comprising rudders provided along both the side walls of a propulsion fan duct having a fan, the rear sides of said rudders being bent toward the outside of the propulsion fan duct.

According further to the present invention, there is also provided an apparatus for controlling air cushion vehicle comprising operation arms respectively provided at the rudder rotary shafts of the rudders bent outwardly at the the rear sides provided at the left and right sides and the handle column provided in the driver's can is rotatably provided, a handle column provided in the driver's cab to be rotatably provided, and a control arm extending leftwardly and rightwardly to be provided at the handle column, whereby the operation arm of the left and right rudders are connected to the control arm extending leftwardly and rightwardly through connecting cables.

Other and further objects, features and advantages of the invention will appear more fully from the following description.

DESCRIPTION OF THE PREFERRED EMBODIMENTS

The most preferable embodiment of the present invention will be described in detail with reference to the accompanying drawings.

Figure 1:
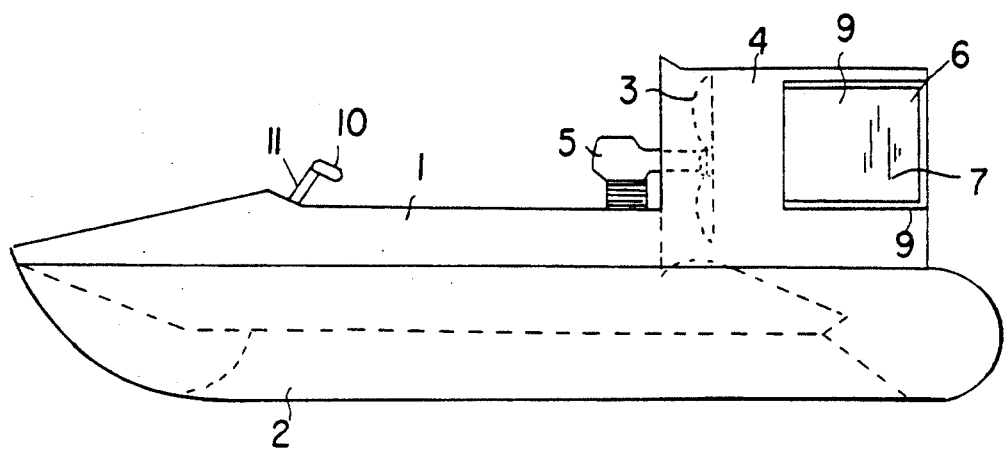
FIG. 1 is a side view of a small-scale air cushion vehicle.
Figure 2:
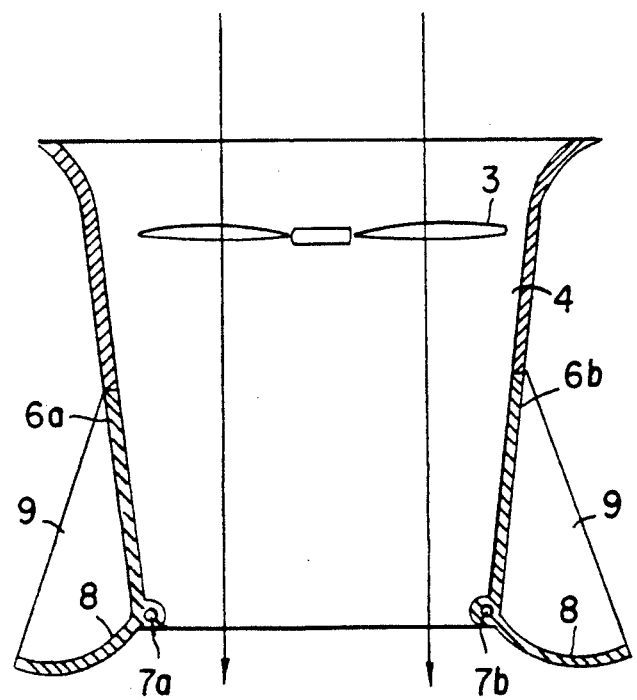
FIG. 2 is a lateral cross sectional view showing an essential portion of a rudder in an operating state that the air cushion vehicle is moved linearly.
Figure 3:
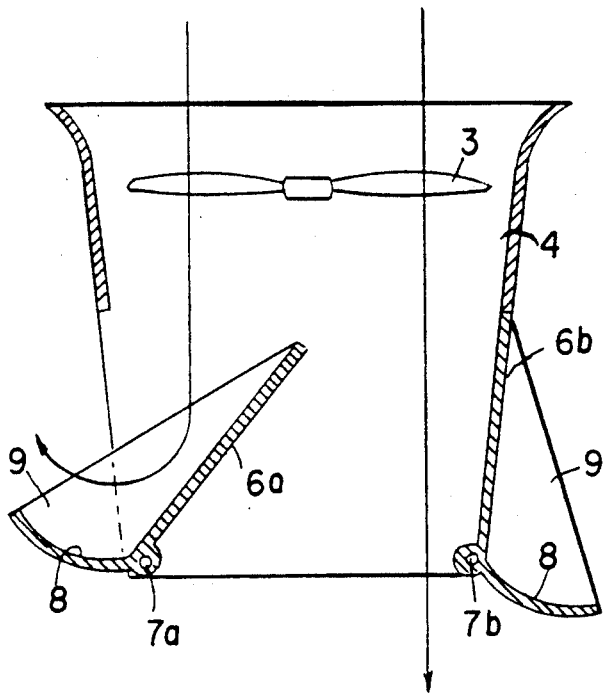
FIG. 3 is a lateral cross sectional view showing an essential portion of a rudder in an operating state that the air cushion vehicle is turned to the left.
Figure 4:
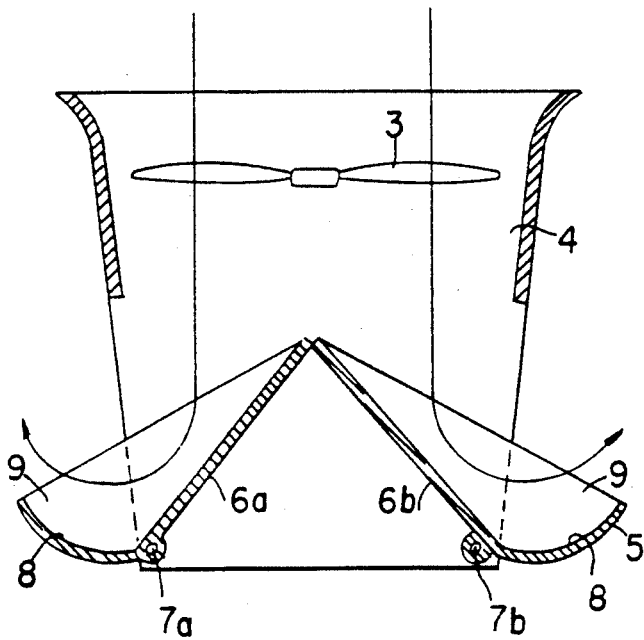
FIG. 4 is a lateral cross sectional view showing an essential portion of a rudder in an operating state that the air cushion vehicle is moved reversely.

FIG. 1 is a side view of a small-scale type air cushion vehicle. FIGS. 2 to 4 are lateral cross sectional plan views of an essential portion showing the operating state of a rudder, wherein FIG. 2 shows a state when the air cushion vehicle is moved linearly, FIG. 3 shows a state when the air cushion vehicle is turned to the left, and FIG. 4 shows a state when the air cushion vehicle is moved reversely.

Figure 5:
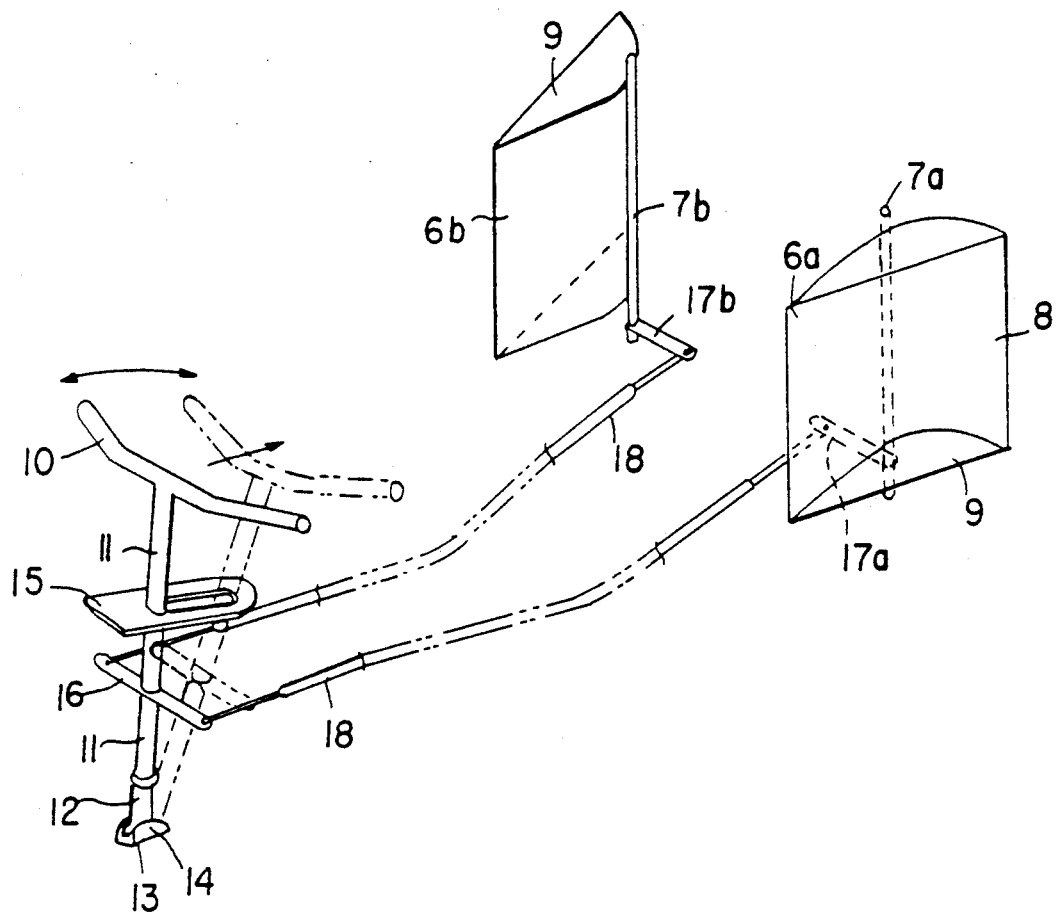
FIG. 5 is a perspective view of an essential portion showing the relationship between a handle and a rudder.
Figure 6:
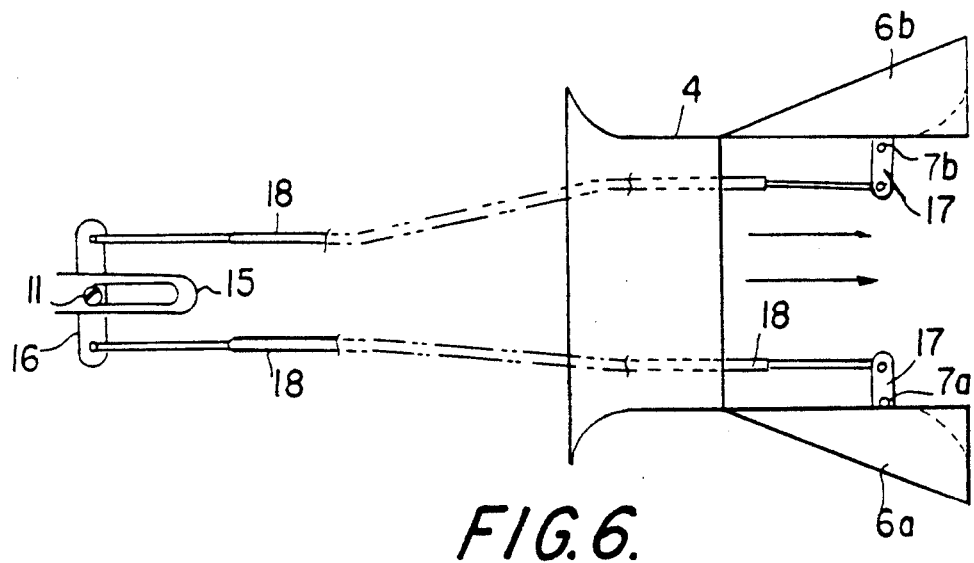
FIG. 6 is a plan view of an essential portion showing the operation of a handle and the operating state of a rudder in a state that the air cushion vehicle is moved linearly.
Figure 7:
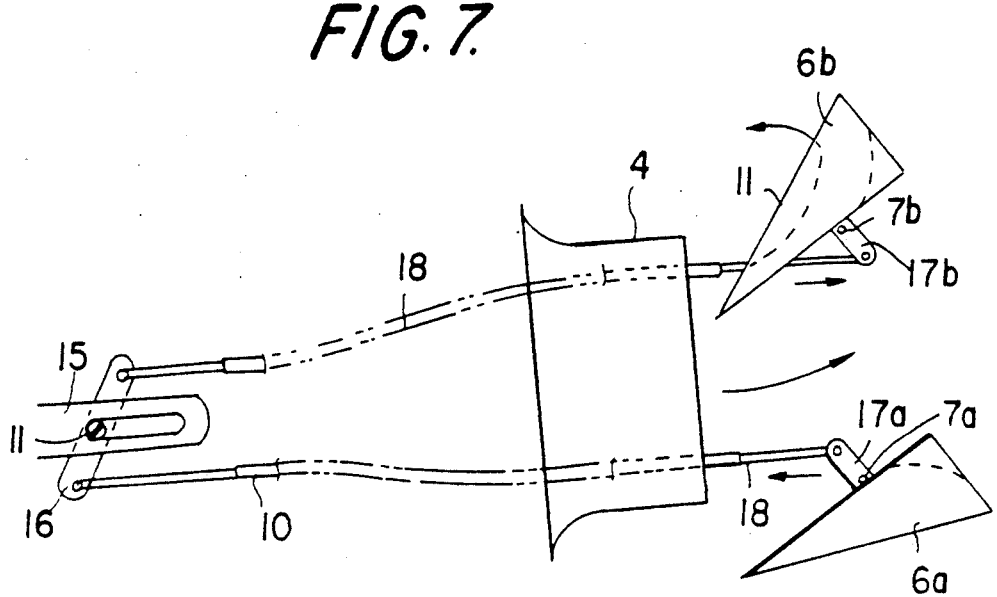
FIG. 7 is a plan view of an essential portion showing the operation of a handle and the operating state of a rudder in a state that the air cushion vehicle is turned to the right.
Figure 8:
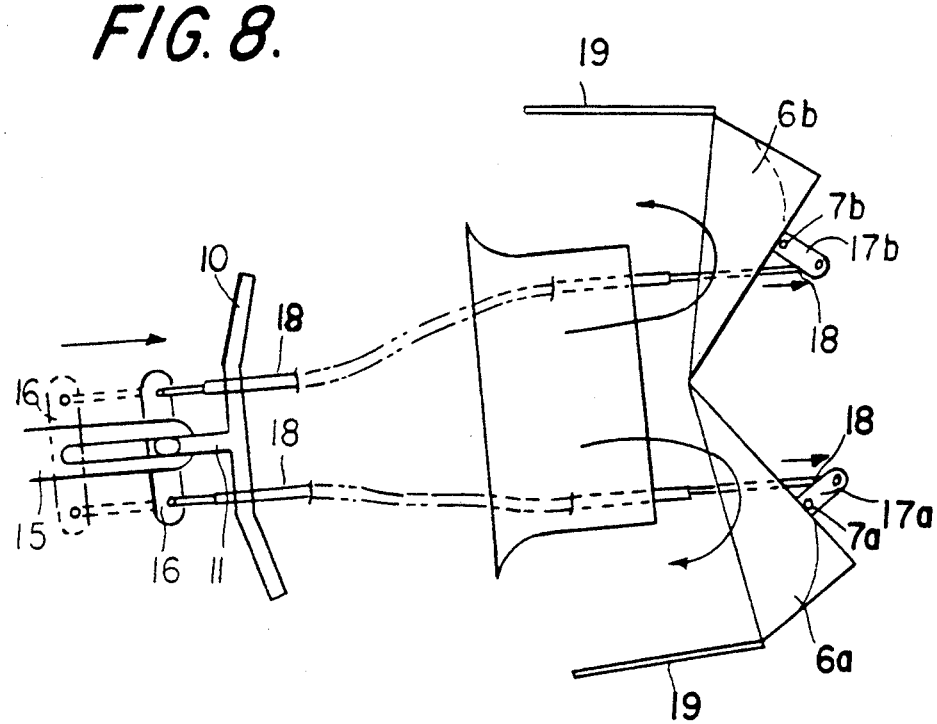
FIG. 8 is a plan view of an essential portion showing the operation of a handle and the operating state of a rudder in a state that the air cushion vehicle is moved reversely.
Figure 9:
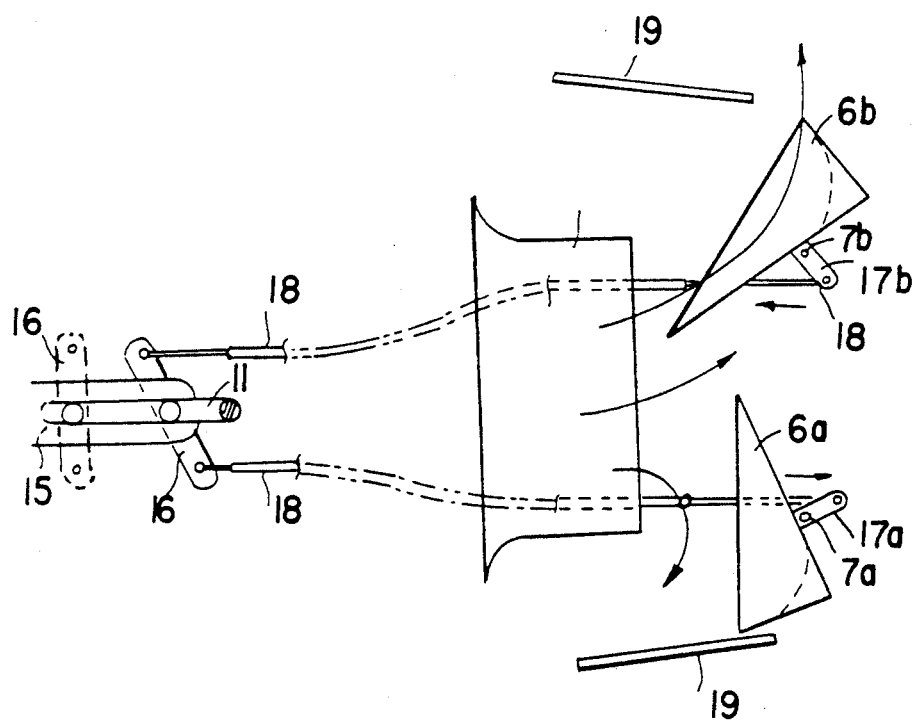
FIG. 9 is a plan view of an essential portion showing the operation of a handle and the operating state of a rudder in a state that the air cushion vehicle is turned to the left when the air cushion vehicle is moved reversely.

FIG. 5 is a perspective view of an essential portion showing the relationship between and a handle and a rudder. FIGS. 6 to 9 show plan views of an essential portion showing the operation of the handle and the operating state of the rudder, wherein FIG. 6 shows a state when the air cushion vehicle is moved linearly, FIG. 7 shows a state that the air cushion vehicle is turned to the left, FIG. 8 shows a state that the air cushion vehicle is moved reversely, and FIG. 9 shows a state that the air cushion vehicle is turned to the left when moving reversely.

In the drawings, reference numeral 1 denotes a body of a small-scale type air cushion vehicle, and a skirt 2 containing air is mounted on an outer peripheral edge of the air cushion vehicle body 1. Numeral 3 denotes a fan mounted in a propulsion fan duct 4 and disposed at the rear side of vehicle body 1. The fan 3 is rotated by an engine 5, an air stream is generated in the propulsion fan duct 4 upon rotation of the fan 3, and the vehicle body 1 is traveled by the pressure of the air stream discharged from the propulsion fan duct 4. It is effective to supply the part of the air stream discharged from the propulsion fan duct 4 into the skirt 2 provided at the outer peripheral edge of the vehicle body 1. Numeral 6 denotes rudders respectively provided along the right and left side walls of the propulsion fan duct 4 and rotatably supported by rudder rotary shafts 7. As examples of providing the rudders 6 along the side walls of the propulsion fan duct 4, there are cases that the rudders 6 are provided on the extension lines of the side walls of the rear ends of the side walls of the propulsion fan duct 4 and that the rudders 6 are provided as parts of the side walls of the propulsion fan duct 4. When the rudders 6 are provided at the rear ends of the propulsion fan duct 4, it is preferable to so provide guide plates continuously to the propulsion fan duct 4 as to cover the upper and lower surfaces thereof on which left and right rudders 6a and 6b are disposed. The rudder 6 is formed with a bent portion 8 bent at its rear side toward the outside of the propulsion fan duct 4. The bent portion 8 is provided to form a bent surface on the outside wall of the bent portion 8a of the rudder as shown in FIG. 2 and other drawings or to form the thick outside wall of the bent portion 8 of the rudder 6 as shown in FIG. 6 and other drawings so that the surface disposed inside the propulsion fan duct 4 is formed entirely flat. Or, ceiling plates 9 and 9 are provided on the upper and lower surfaces of the rudder 6 formed with the bent portion 8, and the rudder 6 is formed in a bucket shape. In this case, it is effective to prevent the air stream from unnecessarily leaking.

The operation of the rudders 6 will be described. As shown in FIG. 2, the left and right rudders 6a and 6b which are not yet operated, are held along the side walls of the propulsion fan duct 4, the air stream generated upon rotation of the fan 3 is injected toward a rearward direction as designated by an arrow without any resistance, thereby forwarding the air cushion vehicle. When the front end of the left rudder 6a is turned inside the propulsion fan duct 4 as shown in FIG. 3, the part of the air stream generated upon rotation of the fan 3 is injected toward the left side of the vehicle body 1 along the left rudder 6a as shown by an arrow, thereby turning the air cushion vehicle to the left. Similarly, when the front end of the right rudder 6b is turned inside the propulsion fan duct 4, the air cushion vehicle is turned to the right. Further, as shown in FIG. 4, when both the left and right rudders 6a and 6b are operated to turn the front ends of the left and right rudders 6a and 6b inside the propulsion fan duct 4 to be approached to each other, the air stream generated upon rotation of the fan 3 is injected forward from both sides of the vehicle body 1 along the bent portions 8 and 8 of the left and right rudders 6a and 6b as shown by arrows, thereby moving reversely the air cushion vehicle. In this case, when the air cushion vehicle is moved forwardly, the forward movement of the air cushion vehicle is abruptly braked.

Numeral 10 denotes a handle provided in a driver's can of the vehicle body 1 and having a handle column 11. The handle 10 may be formed as a lever extending rightward and leftward as shown in FIG. 5, but may be formed in an other shape such as an annular shape. The handle column 11 is engaged with a base shaft 12 to be rotatably supported thereto, and so rotatably supported to the supporting shaft 14 of supporting fittings 13 attached to the vehicle body 1 as to be tiltable longitudinally. In other words, the handle column 11 is supported rotatably around its axis as a center and also tiltably in its longitudinal direction. To this end, the handle column may employ other suitable means such as a universal joint or the like. It may also be to provide a suitable braking device for holding the handle column 11 at a rotating position or a tilting position or a returning device for automatically returning the rotating position or the tilting position of the handle column 11 to the original position. Numeral 15 denotes a handle column guide plate having a longitudinally long hole. The handle column 11 is engaged within the long hole of the handle column guide plate 15 to guide the longitudinal tilting of the handle column 11. Numeral 16 denotes a control arm, which is formed as a lever extending laterally with respect to the handle column 11. Numeral 17 denotes operation arms protruding from left and right rudder rotary shafts 7a and 7b, which are operated to rotate the rudder rotary shafts 7 and hence the rubbers 6. Numeral 18 denotes connecting cables for connecting both sides of the control arms 16 extending leftward and rightward from the handle column 11 to the operation arms 17a and 17b protruding from the left and right rudder rotary shafts 7a and 7b. Numeral 19 denotes auxiliary guide plates provided at the outside of the rudders 6 to be provided to aid the change of the air streams by the rudders 6 as required.

The relationship between the operation of the handle 10 and the operating states of the rudders 6 will be described.

FIG. 6 shows a state that the handle 10 is held at a neutral point. In this state, the left and right rudders 6a and 6b are held at their inner surfaces in parallel toward the rearward direction. Thus, the air stream from the propulsion fan duct 4 flows rearward without any disturbance, thereby linearly moving the air cushion vehicle.

FIG. 7 shows a state that the handle 10 is turned to the right. The control arm 16 provided at the handle column 11 is turned to the right, the operation arm 17a is pulled forwardly and the operation arm 17b is moved rearwardly through the connecting cables 18 and 18, thereby turning the rudders 6a and 6b. Thus, the air stream from the propulsion fan duct 4 is fed to the right side of the vehicle body 1 by the rudders 6a and 6b, thereby turning the air cushion vehicle to the right. To turn the air cushion vehicle to the left, the handle 10 is turned, on the contrary, to the left.

FIG. 8 shows a state that the handle 10 is pulled rearwardly to tilt the handle column 11 rearwardly. The control arm 16 is moved rearwardly, the left and right operation arms 17a and 17b are moved rearwardly through the connecting cables 18 and 18, the front ends of the left and right rudders 6a and 6b approach each other to block the propulsion fan duct 4. Accordingly, the air stream from the propulsion fan duct 4 is discharged through the bent portions 8 and 8 of the left and right rudders 6a and 6b from both sides of the vehicle body 1 forwardly, thereby moving reversely the air cushion vehicle.

FIG. 9 shows a state that the handle 10 is further turned to the left in a state that the handle 10 is pulled rearwardly to tilt the handle column 11 rearwardly. The control arm 16 is moved rearwardly, turned to the left, the operation arm 17a is moved further rearwardly and the operation arm 17b is pulled forwardly through the connecting cables 18 and 18. Accordingly, the part of the air stream from the propulsion fan duct 4 is discharged forwardly from the left side of the vehicle body 1 by the rudder 6a, and the part of the air stream is discharged to the right side of the vehicle body 1 by the rudder 6b, thereby turning the air cushion vehicle to the right while moving rearwardly.

According to the present invention as described above, the rudders are provided along both the side walls of the propulsion fan duct having the fan. Accordingly, the rudders do not normally disturb the air stream from the propulsion fan duct, thereby efficiently moving linearly the air cushion vehicle.

According to the present invention as described above, the rear sides of the rudder provided along both the side walls of the propulsion fan duct are bent toward the outside of the propulsion fan duct. Accordingly, when the rudders are operated, the air stream from the propulsion fan duct is positively altered by the bent portions, thereby easily converting the direction of the air cushion vehicle.

According further to the present invention as described above, the rear sides of the rudders along both the side walls of the propulsion fan duct are bent toward the outsides of the propulsion fan duct. Accordingly, when both the left and right rudders are operated to approach the front ends of the rudders in the propulsion fan duct, the air stream from the propulsion fan duct can be so converted as to flow forwardly from both the left and right sides of the air cushion vehicle through the bent portions of the left and right rudders, thereby easily abruptly braking the air cushion vehicle at the time of linearly moving and performing the reverse traveling of the air cushion vehicle.

According to the present invention as described above, the operation arms are respectively provided at the rudder rotary shafts of the rudders bent outwardly at the the rear sides provided at the left and right sides and the handle column provided in the driver's can is rotatably provided, the handle column provided in the driver's cab is rotatably provided, the control arm extending leftwardly and rightwardly is provided at the handle column, the operation arm of the left and right rudders are connected to the control arm extending leftwardly and rightwardly through the connecting cables. Accordingly, when the handle is operated to rotate the handle column to the left or to the right, the left and right rudder rotary shafts are rotated to the right or to the left through the control arm provided at the handle column, the connecting cables and the operation arms provided at the rudder rotary shafts provided to alter the directions of the left and right rudders, thereby altering the flow of the air stream from the propulsion fan duct to the left or to the right. Therefore, the direction of the air cushion vehicle can be easily altered by the handle operation.

According to the present invention as described above, the handle column is tiltable in the longitudinal direction in the air cushion vehicle in which the operation arms are provided at the rudder rotary shafts of the rudder bent outwardly at the rear sides provided at the left and right sides, the handle column provided in the driver's cab is rotatably provided, the control arm extending leftwardly and rightwardly is provided at the handle column, and the operation arms of the left and right rudders are connected to the control arm extending leftwardly and rightwardly through the connecting cables. Accordingly, when the handle is operated to tilt the handle column, for example, in the rearward direction, the operation arms provided at the rudder rotary shafts is moved rearwardly through the operation arms provided at the handle column and the left and right connecting cables, the left and right rudder rotary shafts are turned to the left or to the right thereby to approach the front ends of the left and right rudders in the propulsion fan duct, thereby converting the air stream from the propulsion fan duct from the left and right sides of the air cushion vehicle toward the forward direction by the bent portions of the rudders. Accordingly, the air cushion vehicle can be abruptly braked or moved reversely at the time of moving linearly of the air cushion vehicle easily by utilizing the handle used for converting the direction.

I claim:

1. An apparatus for controlling air cushion vehicle comprising;

rudders provided along both left and right side walls of a propulsion fan duct and rotatably supported at the rudder rotary shafts, the rear sides of said rudders being bent toward the outside of the propulsion fan duct and being composed in a bucket shape, a handle, provided in a driver's cab, being supported by a handle column rotatably and movably in both forward and rearward directions of the air cushion vehicle, driving control arms protruding leftwardly and rightwardly from the handle column, operating arms protruding from left and right rudder rotary shafts of the left and right rudders, connecting cables which connect the left and right driving control arms to the left and right operation arms respectively and by which left and right turn as well as forward and backward movement of an air cushion vehicle can be easily controlled with a single handle operation.

2. An apparatus for controlling an air cushion vehicle comprising a propulsion fan duct having left and right side walls; and and means to control left and right turn and forward and backward movement of an air cushion vehicle by single handle operation including left and right rudders provided respectively along said left and right side walls;

left and right rudder rotary shafts respectively supporting said left and right rudders;

each of said rudders having a forward surface forming an extension of a respective said side wall, and a bucket shaped rearward bent surface bent outward from the outside of said propulsion fan duct and extending as a prolongation of said forward surface;

a handle provided in a driver's cab of the air cushion vehicle;

a handle column supporting said handle with said handle column movable rotatably and in both forward and rearward directions of the air cushion vehicle;

left and right driving control arms extending to the left and to the right respectively from said handle column;

left and right operation arms extending respectively from said left and right rudder rotary shafts;

and left and right connecting cable respectively connecting said left and right driving control arms to said left and right operation arms.

* * * * *